United States Patent
Nakai

(10) Patent No.: US 8,139,616 B2
(45) Date of Patent: Mar. 20, 2012

(54) PULSED LIGHT GENERATOR AND PULSED FIBER LASER

(75) Inventor: Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/841,730

(22) Filed: Jul. 22, 2010

(65) Prior Publication Data

US 2010/0284429 A1 Nov. 11, 2010

Related U.S. Application Data

(63) Continuation of application No. PCT/JP2009/062223, filed on Jul. 3, 2009.

(30) Foreign Application Priority Data

Jul. 3, 2008 (JP) ................................ 2008-174905

(51) Int. Cl.
*H01S 3/11* (2006.01)

(52) U.S. Cl. .................. 372/10; 372/6; 372/11; 372/12; 372/13; 372/14; 372/15; 372/16; 372/17; 372/18; 372/19; 372/26; 372/30; 372/92; 372/98; 372/99; 372/101; 372/102; 372/108

(58) Field of Classification Search .............. 372/10–19, 372/26, 30, 92, 98, 99, 101, 102, 108
See application file for complete search history.

(56) References Cited

U.S. PATENT DOCUMENTS

| | | | |
|---|---|---|---|
| 5,729,641 A * | 3/1998 | Chandonnet et al. | 385/2 |
| 6,888,853 B1 * | 5/2005 | Jurgensen | 372/6 |
| 2002/0018630 A1 * | 2/2002 | Richardson et al. | 385/127 |
| 2005/0276286 A1 * | 12/2005 | MacCormack et al. | 372/10 |
| 2006/0171426 A1 * | 8/2006 | Starodoumov et al. | 372/6 |
| 2006/0279794 A1 * | 12/2006 | Jurgensen | 358/3.29 |
| 2010/0069723 A1 * | 3/2010 | Islam | 600/300 |

FOREIGN PATENT DOCUMENTS

JP 3219415 B2 4/1992

(Continued)

OTHER PUBLICATIONS

Ding-Wei Huang et al., "Q-Switched All-Fiber Laser with an Acoustically Modulated Fiber Attenuator", IEEE Photonics Technology Letters, Sep. 2000, pp. 1153-1155, vol. 12, No. 9.

*Primary Examiner* — Jessica Stultz
*Assistant Examiner* — Delma R Forde
(74) *Attorney, Agent, or Firm* — Sughrue Mion, PLLC

(57) ABSTRACT

A pulsed light generator of the invention includes: an excitation light source; a fiber grating into which excitation light from the excitation light source enters; a rare-earth doped optical fiber optically coupled with the fiber grating, in which a rare-earth element is doped into a core, serving as an optical transmitting section; an optical switch including a deflection element for causing a Q-switching operation; a first optical fiber that causes light from the rare-earth doped optical fiber to enter into the optical switch; and a second optical fiber for waveguiding pulsed light output from the optical switch. One surface side of the optical switch, into which light enters, is subjected to anti-reflection treatment with a reflectance with respect to a wavelength of the pulsed light output from the optical switch being 0.1% or less. A low-reflection section having a reflectance with respect to the wavelength of the pulsed light output from the optical switch of from 1% to 60% inclusive, is arranged on an other surface side of the optical switch, from which light is emitted.

5 Claims, 6 Drawing Sheets

FOREIGN PATENT DOCUMENTS

| | | | |
|---|---|---|---|
| JP | 05-129684 | * | 5/1993 |
| JP | 05-129684 A | | 5/1993 |
| JP | 2005-183853 | * | 7/2005 |
| JP | 2005-183853 A | | 7/2005 |
| JP | 2006-005349 A | | 1/2006 |
| JP | 2007-523499 A | | 8/2007 |
| WO | 2005/083851 A2 | | 9/2005 |

* cited by examiner

PULSED LIGHT GENERATOR AND PULSED FIBER LASER

TECHNICAL FIELD

The present invention relates to a pulsed light generator, and more particularly relates to a pulsed light generator that can output a short pulse, and a pulsed fiber laser including the pulsed light generator.

Priority is claimed on Japanese Patent Application No. 2008-174905, filed Jul. 3, 2008, the contents of which are incorporated herein by reference.

BACKGROUND ART

For example, in Patent Document 1 there is disclosed a Fabry-Perot fiber laser.

In order to cause the Fabry-Perot fiber laser to operate as a pulsed laser by a Q-switching operation, an optical switch that instantaneously changes optical transmittance is arranged inside a resonator. Such an optical switch includes an LN modulator, an acousto-optic modulator (AOM), and a variable optical attenuator (VOA) such as a mechanical shutter.

In the pulsed laser, it is important to shorten the pulse width in order to increase workability. A Q-switched laser generates pulses having a pulse width of the order of from 10 neck to 100 nsec. In the Q-switched fiber laser, because the resonator length tends to be long, it is difficult to generate a short pulse, as compared with a solid-state laser.

In a Q-switched pulse oscillator configured in this manner, as a solution to shorten the pulse width, there can be mentioned: (1) a method of increasing the circulation gain of the oscillator by increasing feedback; (2) a method of increasing the circulation gain of the oscillator by increasing the gain of the amplifier; and (3) a method of shortening the resonator length.

However, in the method of increasing the circulation gain of the oscillator by increasing feedback, there is a limitation in the effect of shortening the pulse width.

In the method of increasing the circulation gain of the oscillator by increasing the gain of the amplifier, if the gain of the amplifier is increased, the pulse width is shortened monotonically. However, to do this, an excitation device needs to be high-powered, leading to a cost increase.

In the method of shortening the resonator length, as the resonator length becomes shorter, the pulse width becomes shorter. A fiber resonator consists of optical components and its pig-tail fibers. In the fiber resonator, each component has pig-tail fibers of a certain length, and hence, the total length of the pig-tail fibers depends on the number of parts. Therefore, if the number of parts increases, the total pig-tail fiber length becomes long, thereby increasing the resonator length.

Moreover, with Q-switching, the number of optical parts increases by the number of optical switches. Therefore, connection points between the parts increase, causing an increase in production man-hours and an increase in interconnection loss.

[Prior Art Document]
[Patent Document 1] Japanese Patent No. 3219415

DISCLOSURE OF INVENTION

[Problems to be Solved by the Invention]
The present invention takes into consideration the above situation, with an object of providing a pulsed light generator in which the pulse width is shortened by decreasing the resonator length, so as to obtain high-repetition-rate pulsed light.
[Means to Solve the Problems]
The present invention employs the followings in order to solve the above problems and achieve the object.

(1) A pulsed light generator according to the present invention comprises: an excitation light source; a fiber grating into which excitation light from the excitation light source enters; a rare-earth doped optical fiber optically coupled with the fiber grating, in which a rare-earth element is doped into a core, serving as an optical transmitting section; an optical switch including a deflection element for causing a Q-switching operation; a first optical fiber that causes light from the rare-earth doped optical fiber to enter into the optical switch; and a second optical fiber for waveguiding pulsed light output from the optical switch. One surface side of the optical switch, into which light enters, is subjected to anti-reflection treatment with a reflectance with respect to a wavelength of the pulsed light output from the optical switch being 0.1% or less. A low-reflection section having a reflectance with respect to the wavelength of the pulsed light output from the optical switch of from 1% to 60% inclusive, is arranged on an other surface side of the optical switch, from which light is emitted.

(2) Preferably the low-reflection section is arranged at a surface of the second optical fiber where the second optical fiber is coupled with the optical switch.

(3) Preferably the low-reflection section is arranged in the optical switch, and between the deflection element and the second optical fiber.

(4) Preferably the low-reflection section is arranged on an outgoing side end face of the deflection element.

(5) The pulsed fiber laser of the present invention comprises a master oscillator and an optical amplifier, and the pulsed light generator according to any one of (1) to (4) described above is used as the master oscillator.
[Effects of the Invention]
According to the pulsed light generator according to (1) described above, a fiber grating is not required on an outgoing side of the optical switch. Therefore, the resonator length can be made short, thereby enabling to make pulses short and to obtain high-repetition-rate pulsed light.

BEST MODE FOR CARRYING OUT THE INVENTION

Hereunder the present invention will be explained in detail with reference to the accompanying drawings. However, the present invention is not limited thereto, and various changes can be made without departing from the gist of the present invention.

"Pulsed Light Generator"

<First Embodiment>

Figure 1A:
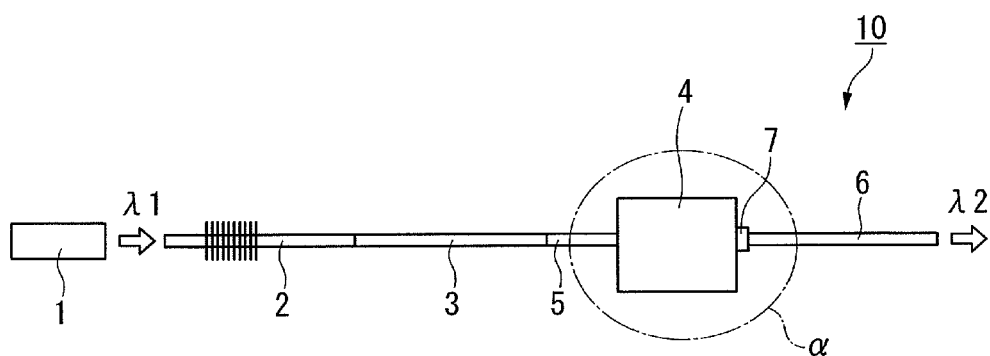
FIG. 1A is a schematic diagram of a pulsed light generator according to a first embodiment or the present invention.
Figure 1B:
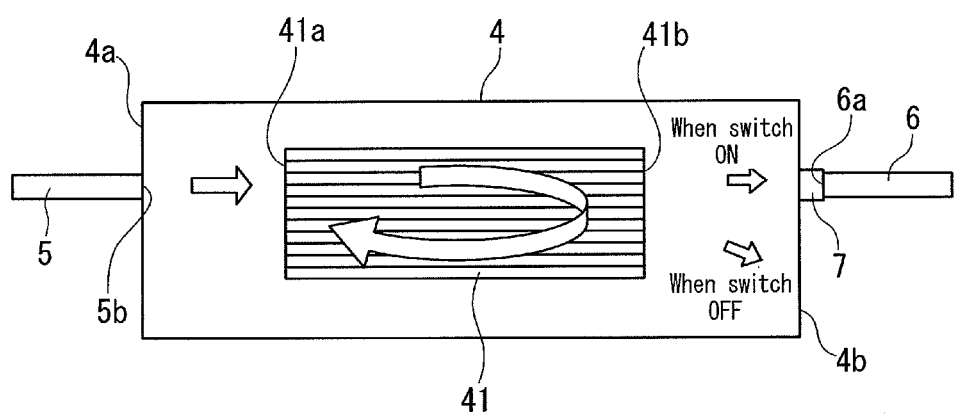
FIG. 1B is a schematic diagram of an optical switch in FIG. 1A.

FIG. 1A is a schematic diagram of a pulsed light generator according to a first embodiment of the present invention. Moreover FIG. 1B is a schematic diagram of a part indicated by α in FIG. 1A, that is, an optical switch.

The pulsed light generator of the present invention includes: an excitation light source 1; a fiber grating 2 into which excitation light from the excitation light source 1 enters; a rare-earth doped optical fiber 3 in which a rare-earth element is doped into a core, serving as an optical transmitting section; a first optical fiber 5 that causes light from the rare-earth doped optical fiber 3 to enter into an optical switch 4; the optical switch 4 including a deflection element 41 for causing a Q-switching operation; and a second optical fiber 6 for waveguiding pulsed light output from the optical switch 4. One end face 4a of the optical switch 4, into which excitation light enters, is subjected to anti-reflection treatment with a reflectance with respect to a wavelength $\lambda 2$ of the pulsed light (hereinafter may be referred to as output pulsed light) output from the optical switch 4 (hereinafter may be simply referred to as "reflectance") being 0.1% or less. A low-reflection section 7 having a reflectance with respect to the wavelength $\lambda 2$ of the pulsed light output from the optical switch 4 of from 1% to 60% inclusive, is arranged on the other end face 4b side of the optical switch, from which light is emitted.

The respective sections will be explained below in detail.

As the excitation light source 1, a laser diode (LD) or the like is preferably used. An oscillation wavelength $\lambda 1$ thereof is not particularly limited, and can be appropriately changed according to the pulsed light generator to be applied.

A conventional well-known fiber grating can be used as the fiber grating 2. However it is preferable to use a highly reflective fiber grating having a reflectance with respect to the wavelength $\lambda 2$ of the output pulsed light of 90% or higher.

Coupling between the excitation light source 1 and the fiber grating 2 can be performed by fusion splicing, or by using a wavelength division multiplexing coupler (WDM coupler) or a dichroic mirror.

The rare-earth doped optical fiber 3 is an optical amplifying fiber in which a rare earth ion such as ytterbium (Yb), erbium (Er), thulium (Tm), neodymium (Nd), or praseodymium (Pr) is doped into the optical transmitting section thereof. A single element can be added, or one in which these rare earth elements are mixed at a desired proportion may be used.

The first optical fiber 5 that guides incoming light into the optical switch 4, and the second optical fiber 6 that guides outgoing light from the optical switch 4 are not particularly limited, and conventional well-known optical fibers can be used.

Preferably a core diameter and a cladding outer diameter of; the opposite ends of the fiber grating 2, the rare-earth doped optical fiber 3, the first optical fiber 5, and the second optical fiber 6 are equalized.

As shown in FIG. 1B, the optical switch 4 includes a deflection element 41 arranged therein, and a Q-switching operation is performed by ON/OFF switching of the deflection element 41.

The excitation light incoming end face 4a of the optical switch 4, that is, a point of connection between the optical switch 4 and the first optical fiber 5, is subjected to anti-reflection treatment with the reflectance with respect to the wavelength $\lambda 2$ of the output pulsed light being 0.1% or less, in order to sufficiently decrease the Q value of the oscillator. If the reflectance of 0.1% or less is not satisfied, the Q value does not become sufficiently low, and hence, oscillation starts even in a state of the optical switch 4 being OFF, and the optical switch 4 does not operate normally.

The anti-reflection treatment is provided by evaporating a dielectric multilayer film that does not reflect laser light from the excitation light source 1.

Preferably the light transmission loss in the optical switch 4 is 4 dB or less. If the light transmission loss exceeds 4 dB, oscillation efficiency decreases significantly.

As the deflection element 41, a variable optical attenuator (VOA), an LN modulator, or the like can be applied as well as an acousto-optical modulator (AOM). An end face 41a of the deflection element 41 on the side where the light enters, is subjected to anti-reflection treatment with a reflectance with respect to the wavelength $\lambda 2$ of the output pulsed light being 0.1% or less, as in the point of connection between the optical switch 4 and the first optical fiber 5. If the reflectance of 0.1% or less is not satisfied, the Q value does not become sufficiently low, and hence, oscillation starts even if the optical switch 4 is OFF, and the optical switch 4 does not normally operate.

The low-reflection section 7 is formed with a dielectric multilayer film or the like, and is arranged at an end face 6a of the second optical fiber 6, into which outgoing light from the optical switch 4 enters.

Preferably the reflectance with respect to the wavelength $\lambda 2$ of the output pulsed light of the low-reflection section 7 is within a range of from 1% to 6% inclusive, and is appropriately adjusted in accordance with the transmission loss of the optical switch 4. For example, when the transmission loss of the optical switch 4 is in an ideal state of 0 dB, the reflectance thereof is preferably from 1% to 10% inclusive. When the transmission loss of the optical switch 4 is 4 dB (16% back and forth), the reflectance is preferably from 6% to 60% inclusive.

If the reflectance with respect to the wavelength $\lambda 2$ of the output pulsed light of the low-reflection section 7 is 1% or less, the pulse width becomes wide abruptly, and oscillation becomes unstable. Moreover if the reflectance exceeds 60%, the pulse width becomes wide gradually and the average output decreases sharply.

The low-reflection section 7 can be acquired by forming a dielectric film on a surface of a base material (for example, a fiber end face, a silicon plate, a surface of a deflection element, or a variable attenuation element).

Figure 2A:
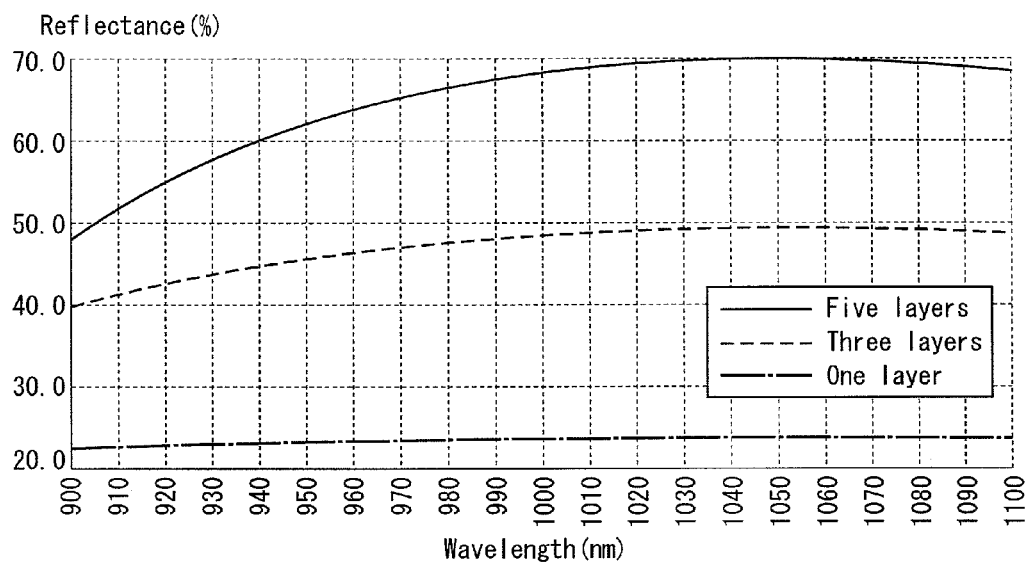
FIG. 2A is a diagram showing a reflectance of a low-reflection section with respect to a wavelength of pulsed light output from the optical switch.

For example, by forming a thin film with one layer of $Ta_2O_5$ on the surface of a fiber end face or silicon plate, then as shown in FIG. 2A, a film (reflection film) having a reflectance of from 1% to 22% inclusive can be obtained.

Moreover, by forming a three-layer film of $Ta_2O_5$—$SiO_2$—$Ta_2O_5$, then as shown in FIG. 2A, a film having a reflectance of up to 49% can be obtained.

Furthermore, by forming a five-layer film of $Ta_2O_5$—$SiO_2$—$Ta_2O_5$—$SiO_2$—$Ta_2O_5$, then as shown in FIG. 2A, a film having a reflectance of up to 70% can be obtained.

In the respective reflection films, if the thickness of each reflection film corresponds to ¼λ of the light desired to be reflected, the largest reflectance can be acquired. The reflectance can be decreased to a desired reflectance by shifting the film thickness from this value.

Thus, as the number of layers of the reflection film increases, the largest reflectance that can be obtained increases and design freedom increases. However, because formation of the reflecting film takes time, it is preferable that the number of layers is small in view of productivity.

Figure 2B:
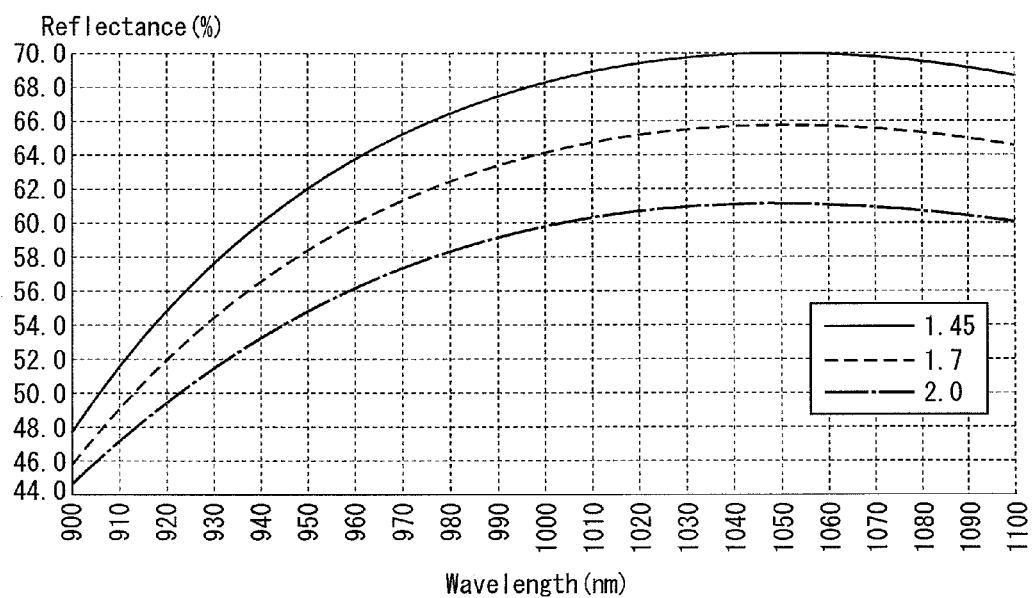
FIG. 2B is a diagram showing a reflectance of a low-reflection section with respect to a wavelength of pulsed light output from the optical switch.

The reflectance of the low-reflection section 7 can also be changed according to the refractive index of the surface to be coated on which the low-reflection section 7 is formed. FIG. 2B shows the reflectance when a low-reflection section 7 formed of a five-layer film of $Ta_2O_5$—$SiO_2$—$Ta_2O_5$—$SiO_2$—$Ta_2O_5$ is provided on base materials respectively having a refractive index of 1.45, 1.7, and 2.0 with respect to 1050 nm. As the base material having a refractive index of 1.45, for example, there is one formed of silicon, which forms a cladding of the optical fiber. As a base material having a refractive index of 1.7, for example, there can be mentioned a transparent body formed of MgO, which is used for a mirror or a lens. As a base material having a refractive index of 2.0, for example, there can be mentioned $TeO_2$ constituting the deflection element 41.

Thus, the reflectance can also be changed according to the location where the low-reflection section 7 is provided (for example, the optical fiber or deflection element).

In the first embodiment, as shown in FIG. 1B, the low-reflection section 7 is fixed to a port at which the switch is turned ON (the end face 6a of the second optical fiber 6 where the transmission loss of the switch decreases). A channel through which light enters, is subjected to anti-reflection treatment with a reflectance with respect to the wavelength λ2 of the output pulsed light being 0.1% or less. Accordingly, when the optical switch 4 is turned ON, light of from 1% to 60% is fed back to the rare-earth doped optical fiber 3. When the optical switch 4 is in an OFF state, light does not return to the rare-earth doped optical fiber 3, and output is not performed. When the optical switch 4 is temporarily turned ON, feedback and output of light are simultaneously started. As a result, the resonator can perform the Q-switching operation. At this time, in the pulsed light generator of the present invention including the optical switch 4, because one end on the output side of the resonator is formed by the end face of the deflection element to perform optical switching, the fiber grating need not be arranged on the output side. Therefore, the resonator length becomes shorter than for a conventional pulsed light generator, and hence the pulse width of output light can be made short.

<Second Embodiment>

Figure 3:
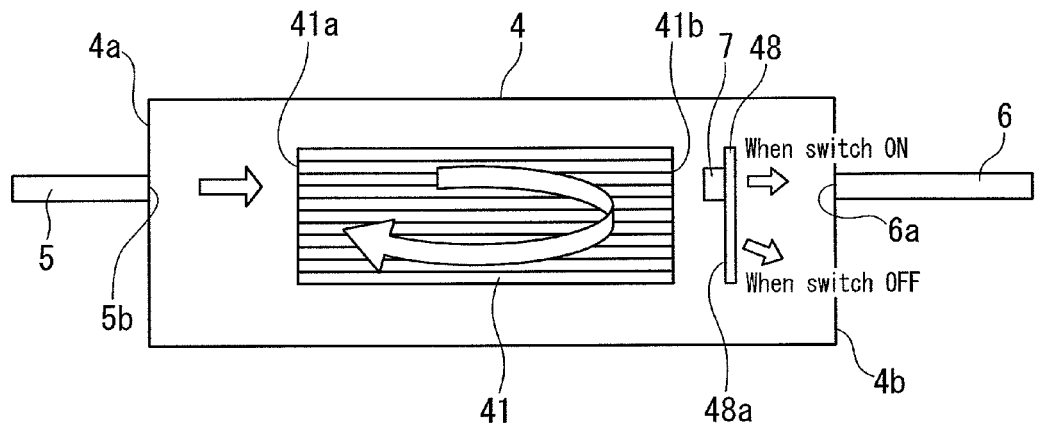
FIG. 3 is a schematic diagram of an optical switch of a pulsed light generator according to a second embodiment of the present invention.

FIG. 3 schematically shows an optical switch 4 of a pulsed light generator according to a second embodiment. The second embodiment is different from the first embodiment in that a low-reflection section 7 is arranged in the optical switch 4 and on a transparent plate 48 arranged between a deflection element 41 and an other end face 4b of the optical switch 4.

The transparent plate 48 subjected to an anti-reflection treatment with a reflectance with respect to the wavelength λ2 of the output pulsed light being 0.1% or less, and is formed of a resin or glass such as PMMA, $TiO_2$, or synthetic silicon. The thickness thereof is appropriately adjusted in accordance with the optical switch to be applied, and is for example, from 100 μm to 2000 μm.

The low-reflection section 7 is arranged on one face 48a of the transparent plate 48, so that emitted light passes therethrough when the optical switch 4 is turned ON.

According to the second embodiment, the reflectance of the low-reflection section 7 can be adjusted according to the refractive index of the material constituting the transparent plate 48, by just changing the material constituting the transparent plate 48. Furthermore, as in the first embodiment, the resonator length and the pulse width can be made short without arranging the fiber grating on the output side, by arranging the transparent plate 48 provided with the low-reflection section 7, in an existing optical switch. Moreover, a pulsed light generator capable of emitting high-repetition-rate pulsed light can be readily acquired. Furthermore, it can reduce irregular fusion bonding problem, and productivity can be improved.

<Third Embodiment>

Figure 4:
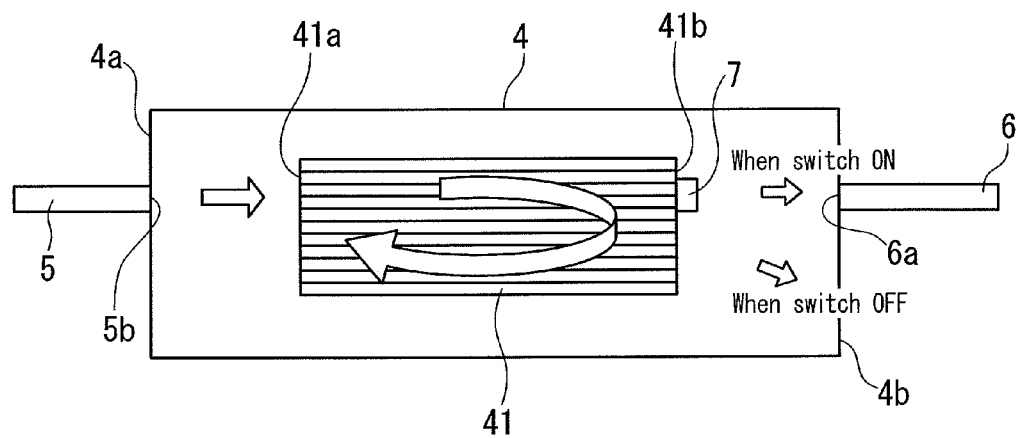
FIG. 4 is a schematic diagram of an optical switch of a pulsed light generator according to a third embodiment of the present invention.

FIG. 4 schematically shows an optical switch 4 of a pulsed light generator according to a third embodiment. This embodiment is different from the first embodiment in that a low-reflection section 7 is arranged on an output surface 41b of a deflection element 41.

As shown in this embodiment, by providing the low-reflection section 7 on the surface of the deflection element 41, the low-reflection section 7 can have a reflectance corresponding to the refractive index of the deflection element 41. Moreover, as in the first embodiment, the resonator length and the pulse width can be made short without arranging the fiber grating on the output side, by applying the deflection element 41 including the low reflection element 7 to the existing optical switch. Furthermore a pulsed light generator capable of emitting high-repetition-rate pulsed light can be readily acquired.

As explained above, in order to acquire a desired reflectance of the low-reflection section 7 in the present invention, a parameter of a reflection film of the low-reflection section 7 is appropriately set according to a part constituting the end face of the resonator. An optimum value is determined for the reflectance of the low-reflection section 7 as well as for the resonator length and the gain, in order to acquire a desired output characteristic (pulse width, average output, and the like) of the pulsed light generator.

<Fourth Embodiment>

Figure 5:
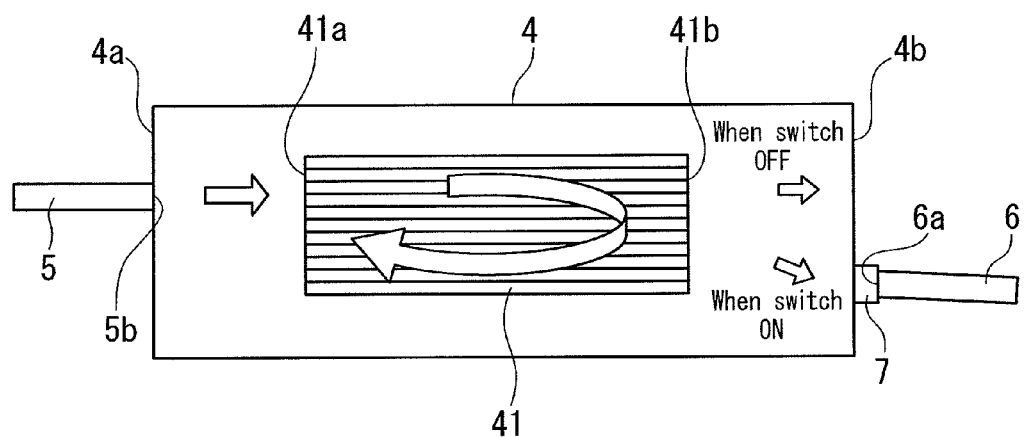
FIG. 5 is a schematic diagram of an optical switch of a pulsed light generator according to a fourth embodiment of the present invention.

FIG. 5 schematically shows an optical switch of a pulsed light generator according to a fourth embodiment. This embodiment is different from the first embodiment in that a low-reflection section 7 is arranged at a surface 6a of an optical fiber 6 to which primary diffracted light enters.

According to this embodiment, also for the primary diffracted light in a specific wavelength band, as in the first embodiment, the resonator length and the pulse width can be made short without arranging the fiber grating on the output side. Moreover, a pulsed light generator capable of emitting high-repetition-rate pulsed light can be readily acquired.

<Fifth Embodiment>

Figure 6:
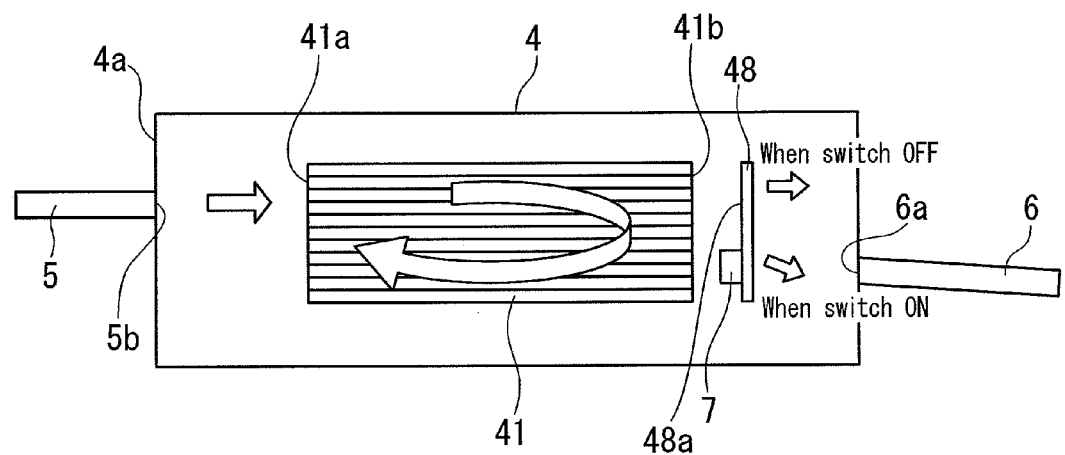
FIG. 6 is a schematic diagram of an optical switch of a pulsed light generator according to a fifth embodiment of the present invention.

FIG. 6 schematically shows an optical switch 4 of a pulsed light generator according to a fifth embodiment. This embodiment is different from the fourth embodiment in that a low-reflection section 7 is provided on a transparent plate 48 arranged in the optical switch 4. The same transparent plate as that of the second embodiment can be appropriately used as the transparent plate 48.

According to this embodiment, the effect of the second embodiment and the effect of the fourth embodiment can be acquired. That is, as in the first embodiment, the resonator length and the pulse width can be made short without arranging the fiber grating on the output side, by arranging the transparent plate 48 including the low-reflection section 7 in the existing optical switch. Moreover, a pulsed light generator capable of emitting high-repetition-rate pulsed light can be readily acquired, also for the primary diffracted light in the specific wavelength band. Furthermore, it can reduce irregular fusion bonding problem, and productivity can be improved.

<Sixth Embodiment>

Figure 7:
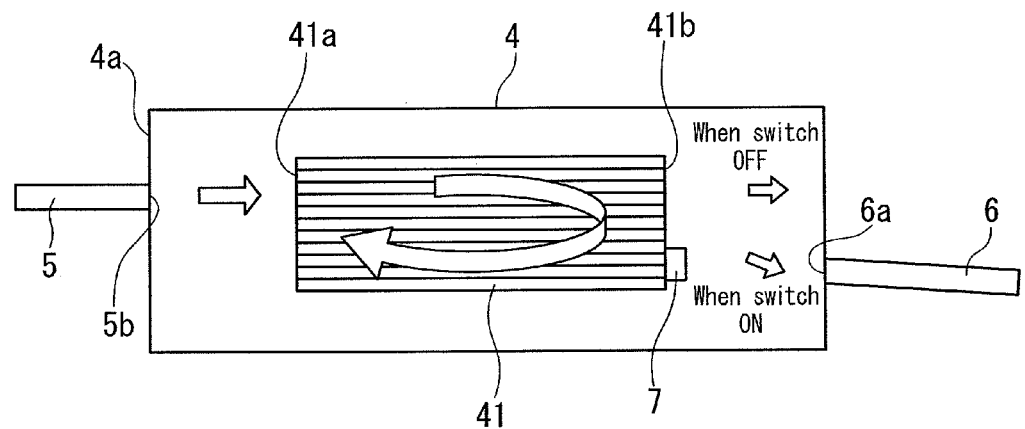
FIG. 7 is a schematic diagram of an optical switch of a pulsed light generator according to a sixth embodiment of the present invention.

FIG. 7 schematically shows an optical switch 4 of a pulsed light generator according to a sixth embodiment. This embodiment is different from the fifth embodiment in that, of an other surface 41b of a deflection element 41, a low-reflection section 7 is arranged in a part in which primary diffracted light is emitted.

According to this embodiment, the effect of the third embodiment and the effect of the fourth embodiment can be acquired. That is, a low-reflection section 7 can have a reflectance according to a refractive index of the deflection element 41 by providing the low-reflection section 7 on the surface of the deflection element 41. As in the first embodiment, the resonator length and the pulse width can be made short without arranging the fiber grating on the output side, by applying the deflection element 41 including the low-reflection section 7 to the existing optical switch. Moreover, a pulsed light generator capable of emitting high-repetition-rate pulsed light can be readily acquired, also for the primary diffracted light in the specific wavelength band.

"Pulsed fiber laser"

Figure 8:
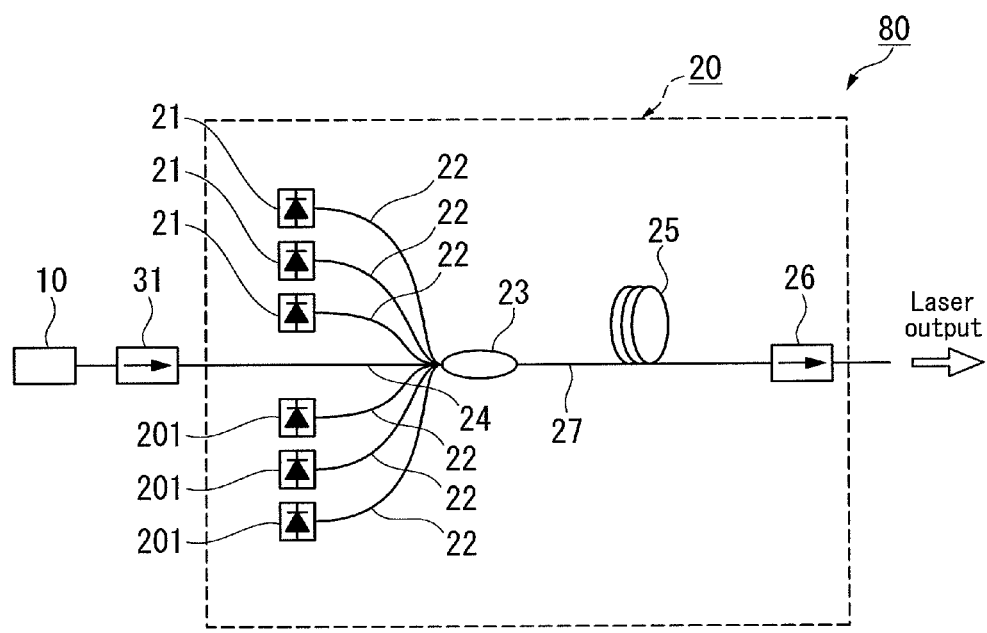
FIG. 8 is a schematic diagram of a pulsed fiber laser to which the pulsed light generator of the present invention is applied.

FIG. 8 is one example schematically showing a pulsed fiber laser 80 at the time of using a pulsed light generator 10 according to the present invention as a master oscillator (hereinafter, referred to as MO). The pulsed fiber laser 80 is schematically constituted of an MO 10 and an optical amplifier 20. Moreover an output side of the MO 10 is connected to the optical amplifier 20 via an interstage isolator 31. Laser light output from the MO 10 is amplified by the optical amplifier 20 via the interstage isolator 31 and output.

As the optical amplifier 20, a conventionally known optical amplifier can be used. For example, there is one including excitation ports 22 from which excitation light from a plurality of excitation light sources 21 enters; a signal port 24 from which laser light from the MO 10 enters; an optical coupler 23 including an emitting port 27, that couples and emits excitation lights entering from the excitation ports 22 and signal light entering from the signal port 24; excitation light sources 21 connected to the excitation ports 22; and an optical fiber 25 connected to the emitting port 27.

Laser light emitted from the MO 10 enters into the optical coupler 23 through the signal port 24, and into a core of the optical fiber 27 via the optical coupler 23. On the other hand, the excitation light sources 21 are respectively connected to the excitation ports 22, and excitation light enters into the optical fiber 27 via the optical coupler 23.

Thereafter, excitation light entering into the optical fiber 27 is output via an isolator 26.

The excitation light sources 21, the excitation ports 22, the optical coupler 23, the signal port 24, the optical fiber 25, the isolator 26, and the emitting port 27 constituting the optical amplifier are not particularly limited and conventionally known ones can be used.

According to the pulsed fiber laser 80 of the present invention, because the pulse width of output light from the master oscillator 10 can be made short, a high-output fiber laser can be acquired.

EXAMPLES

<Example 1>

The pulsed light generators shown in FIGS. 1A and 1B were prepared and used for Example 1. A semiconductor laser having an oscillation wavelength $\lambda 1$ of 976 nm and an output of 300 mW was used as the excitation light source. A Yb-doped single mode fiber having an absorption factor of 600 dB/m and a length of 30 cm was used as the optical fiber. A fiber grating with a reflectance with respect to a wavelength of from 1060 nm to 1070 nm being 95% was used as the fiber grating. An AOM provided with a reflection end of 1 channel was used as the optical switch. The excitation light source and the fiber grating were connected by fusion bonding. Cores of the fibers used (opposite ends of the fiber grating, the optical fiber, and the fiber at opposite ends of the optical switch) were equalized to have a diameter of about 4 μm and a cladding outer diameter of 125 μm.

As the low-reflection section, a thin film with one layer of $Ta_2O_5$ was formed to 45 nm. The reflectance of the low-reflection section in this example was about 10%.

<Example 2>

A pulsed light generator was prepared in the same manner as in Example 1, except that a three-layer film of $Ta_2O_5$—$SiO_2$—$Ta_2O_5$ was formed to 350 nm as the low-reflection section, and this was used for Example 2. The reflectance of the low-reflection section in this example was about 30%.

<Example 3>

A pulsed light generator was prepared in the same manner as in Example 1, except that a five-layer film of $Ta_2O_5$—$SiO_2$—$Ta_2O_5$—$SiO_2$—$Ta_2O_5$ was formed to 700 nm as the low-reflection section, and this was used for Example 3. The reflectance of the low-reflection section in this example was about 60%

<Comparative Example>

Figure 10A:
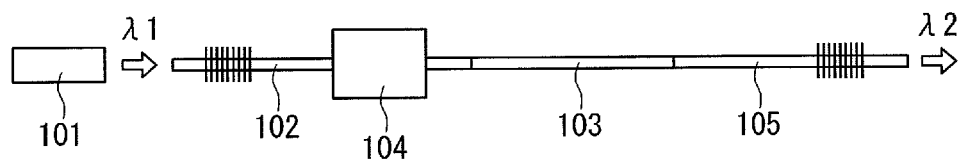
FIG. 10A is a schematic diagram of a conventional pulsed light generator.
Figure 10B:
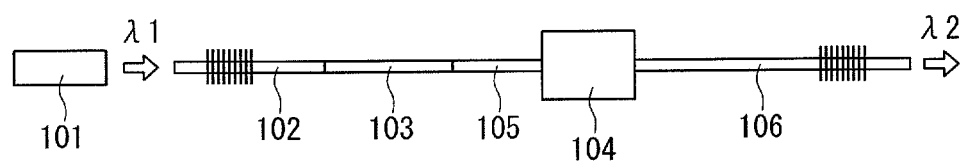
FIG. 10B is a schematic diagram of a conventional pulsed light generator.

A conventional pulsed light generator as shown in FIG. 10B was prepared, and this was used as a Comparative Example. Fiber gratings 102 and 106, and optical fibers 103 and 105 used here were the same as those in Example 1.

Figure 9A:
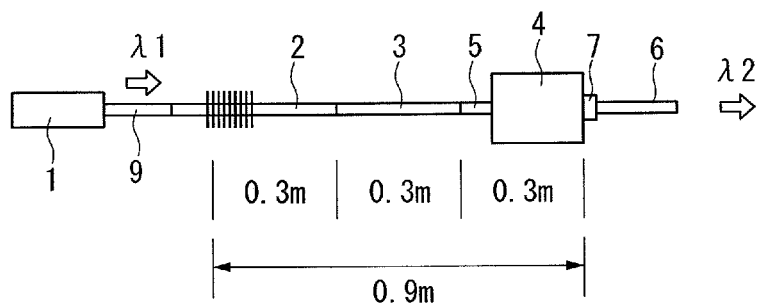
FIG. 9A is a schematic diagram of a pulsed light generator of an example.
Figure 9B:
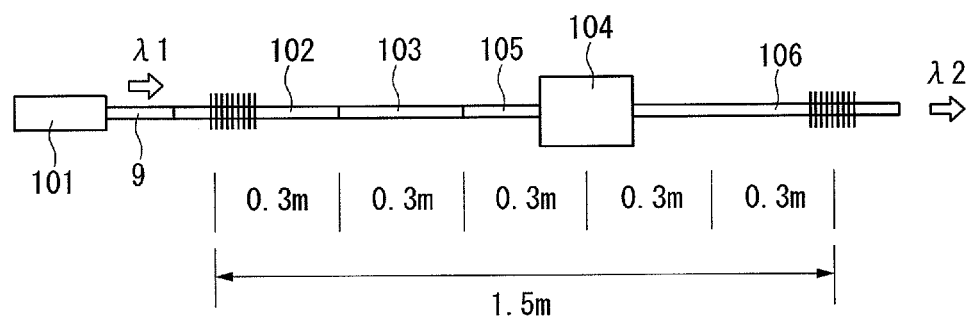
FIG. 9B is a schematic diagram of a pulsed light generator of a comparative example.

The pulsed light generators in the Examples and the Comparative Example, and the size thereof are schematically shown in FIGS. 9A and 9B. FIG. 9A shows the pulsed light generator in Examples 1 to 3, and FIG. 9B shows the pulsed light generator in the Comparative Example.

As shown in FIG. 9A and FIG. 9B, in the pulsed light generator in Examples 1 to 3, the resonator length can be made considerably shorter than for the conventional pulsed light generator in the Comparative Example (a resonator length of approximately 60% of the conventional length).

The pulse width was measured by using the pulsed light generators in Examples 1 to 3, and the Comparative Example, with an output being changed to 100 mW, 150 mW, and 200 mW. The results are shown in Table 1.

TABLE 1

| Excitation Power (mW) | Pulse Width (nsec) | | | |
|---|---|---|---|---|
| | Example 1 | Example 2 | Example 3 | Comparative Example |
| 100 | 57 | 50 | 48 | 126 |
| 150 | 39 | 36 | 37 | 84 |
| 200 | 31 | 32 | 37 | 66 |

From Table 1, in the pulsed light generators in Examples 1 to 3, an effect of decreasing the pulse width to about 50% of that in the Comparative Example can be acquired.

Industrial Applicability

The present invention can be applied to a Fabry-Perot fiber laser.

[Description of the Reference Symbols]

| | |
|---|---|
| 1 | Excitation light source |
| 2 | Fiber grating |
| 3 | Rare-earth doped optical fiber |
| 4 | Optical switch |
| 5 | First optical fiber |
| 5a | Outgoing end face of first optical fiber |
| 6 | Second optical fiber |
| 6a | Incoming end face of second optical fiber |
| 7 | Low-reflection section |
| 41 | Deflection element |
| 41a | Incoming end face of deflection element |
| 41b | Outgoing end face of deflection element |
| 48 | Transparent plate |

The invention claimed is:

1. A pulsed light generator comprising:
an excitation light source;
a fiber grating into which excitation light from the excitation light source enters;
a rare-earth doped optical fiber optically coupled with the fiber grating, in which a rare-earth element is doped into a core, serving as an optical transmitting section;
an optical switch including a deflection element for causing a Q-switching operation;
a first optical fiber that causes light from the rare-earth doped optical fiber to enter into the optical switch; and
a second optical fiber for waveguiding pulsed light output from the optical switch, wherein
one surface side of the optical switch, into which light enters, is subjected to anti-reflection treatment with a reflectance with respect to a wavelength of the pulsed light output from the optical switch being 0.1% or less, and
a low-reflection section having a reflectance with respect to the wavelength of the pulsed light output from the optical switch of from 1% to 60% inclusive, is arranged on an other surface side of the optical switch, from which light is emitted.

2. A pulsed light generator according to claim 1, wherein the low-reflection section is arranged at a surface of the second optical fiber where the second optical fiber is coupled with the optical switch.

3. A pulsed light generator according to claim 1, wherein the low-reflection section is arranged in the optical switch, and between the deflection element and the second optical fiber.

4. A pulsed light generator according to claim 1, wherein the low-reflection section is arranged on at least one part of an outgoing end face of the deflection element.

5. A pulsed fiber laser comprising a master oscillator and an optical amplifier, in which the pulsed light generator according to claim 1 is used as the master oscillator.

* * * * *